(12) United States Patent
Bader et al.

(10) Patent No.: US 6,413,333 B1
(45) Date of Patent: Jul. 2, 2002

(54) ORIENTED HDPE FILMS WITH SKIN LAYERS

(75) Inventors: Michael John Bader, Fairport; Jeffrey James O'Brien, Walworth, both of NY (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 08/466,171

(22) Filed: Jun. 6, 1995

Related U.S. Application Data

(60) Division of application No. 08/206,574, filed on Mar. 4, 1994, now abandoned, which is a continuation-in-part of application No. 08/160,551, filed on Dec. 1, 1993, now abandoned.

(51) Int. Cl.$^7$ .............................................. B29C 47/06
(52) U.S. Cl. ..................... 156/24.11; 427/533; 427/536; 264/448
(58) Field of Search .................................. 427/177, 224, 427/533, 536, 402; 156/244.11; 264/447, 448, 80

(56) References Cited

U.S. PATENT DOCUMENTS

| | | | | |
|---|---|---|---|---|
| 4,692,379 A | * | 9/1987 | Keung et al. ............... | 428/349 |
| 4,734,317 A | * | 3/1988 | Bothe et al. ................. | 428/215 |
| 4,769,418 A | * | 9/1988 | Mizuno et al. .............. | 525/106 |
| 4,961,992 A | * | 10/1990 | Balloni et al. .............. | 428/332 |
| 5,302,442 A | * | 4/1994 | O'Brien et al. ............. | 428/213 |
| 5,314,749 A | | 5/1994 | Shah .......................... | 428/349 |

OTHER PUBLICATIONS

*Encyclopedia of Polymer Science and Engineering.*, vol. 7, pp. 116–127, John Wiley & Sons, Inc (1987).*

* cited by examiner

*Primary Examiner*—Marie Yamnitzky
(74) *Attorney, Agent, or Firm*—Dennis P. Santini; Rick F. James

(57) ABSTRACT

Readily castable high density polyethylene (HDPE) films, preferably containing broad molecular weight distribution HDPE resin having treated upper skin layers and untreated lower skin layers, preferably coextruded, on each side, wherein a particulate cross-linked hydrocarbyl-substituted polysiloxane is present in the untreated lower skin layer to reduce coefficient of friction and enhance machinability. The treated upper skin layer is derived from a polymer, e.g., ethylene-propylene-butene-1 terpolymer, and the lower skin layer is derived from a polymer such as ethylene-propylene-butene-1 terpolymer and LDPE compounded with silicone oil.

4 Claims, No Drawings

ORIENTED HDPE FILMS WITH SKIN LAYERS

CROSS-REFERENCE TO RELATED APPLICATIONS

This is a division of application Ser. No. 08/206,574, filed on Mar. 4, 1994, now abandoned which is a continuation-in-part of prior application Ser. No. 08/160,551, filed Dec. 1, 1993, now abandoned the contents of which are incorporated herein by reference.

FIELD OF THE INVENTION

This invention relates to thermoplastic films and more particularly to films of oriented high density polyethylene (HDPE) which have good dead-fold characteristics, twistability, printability and receptivity of water-based coatings.

BACKGROUND OF THE INVENTION

Blown films of HDPE having an ethylene-vinyl acetate heat seal coating are used for food packaging but such films must have a thickness of about two mils to meet the water vapor transmission (WVTR) requirements for packaging suitable for dry foods such as cereals. Moreover, blown HDPE films do not exhibit the dead-fold properties desirable in food packages particularly of the bag-in-box type.

U.S. Pat. Nos. 4,870,122 and 4,916,025 (Lu) describe HDPE films which have good WVTR properties at film thicknesses of about one mil. The films are produced from high density polyethylene (HDPE) having a density of 0.96 or higher and are biaxially oriented in an imbalanced manner to a degree of about 1.25:1 to about 2:1 in the machine direction (MD) and to a degree of about 6:1 to about 12:1 in the transverse direction (TD). These films have reduced water vapor transmission (WVTR), improved dead-fold characteristics and other physical characteristics which are markedly better than blown HDPE films which can be further improved by the addition of microcrystalline wax. When provided with a heat seal layer by co-extrusion or coating, the films are particularly well suited for use in packaging foods in bag-in-box operations conducted on vertical, form, fill and seal (VFFS) machinery. While the imbalanced orientation confers the desired overall combination of properties on the film, the high degree of orientation in the transverse direction tends to make the film weak in this direction so that it tears relatively easily.

U.S. Pat. Nos. 4,343,852, 4,400,428, 4,419,411, 4,502,263, 4,692,379, and 4,734,317, all of which are incorporated herein by reference, disclose films having a base layer of polypropylene polymers and sealable skin layers on one or more sides of the base layer. However, these structures do not comprise HDPE base layer and typically lack good deadfold properties while having higher water vapor transmission rates associated with polypropylene. Given the differences between polypropylene and HDPE, e.g., in melting point (348° F. for PP, 279° F. for HDPE), processing polypropylene films requires different extrusion temperature, extruder screw design, die design draw down ratio, machine direction orientation temperature and percent, as well as transverse direction orientation temperature and rate.

SUMMARY OF THE INVENTION

The present invention relates to providing a film having good dead fold properties, optical clarity, good slip properties, and good receptivity to water based coatings, including water based inks, water based adhesives and other common water based coatings such as polyvinylidene chloride (PVDC), and acrylics.

The present invention relates to a film of high density polyethylene (HDPE) that has coextruded skin resins, laminated film or coatings on both sides of the HDPE base layer. Up to three layers of skin resins can be on each side of the base layer and can include heat sealable or non heat sealable type skins. For present purposes heat sealable skin resins are those which seal at a minimum seal temperature below the distortion temperature of HDPE base layer film.

More particularly, the present invention relates to an oriented polymer film which comprises:

a) a treated upper skin layer (a) capable of receiving a water base coating, said layer (a) having a surface coextensively adherent to the upper surface of a core layer (b), and an exposed surface, said upper layer (a) being formed from at least one polymer selected from the group consisting of ethylene-propylene-butene-1 terpolymer, ethylene-propylene random copolymer, ethylene-propylene block copolymer, isotactic polypropylene, low density polyethylene (LDPE), very low density polyethylene (VLDPE), linear low density polyethylene (LLDPE), medium density polyethylene (MDPE), polyvinylidene chloride (PVDC), polyvinyl alcohol (PVOH) and acrylic, said upper layer (a) being substantially devoid of silicone oil, the exposed surface of upper layer (a) containing a coefficient of friction-reducing amount of silicone oil transferred to said surface of (a) by contact with a silicone oil present upon the exposed surface of a lower skin layer (c);

b) a base layer (b) derived from HDPE, having an upper surface and lower surface, c) a lower skin layer (c) having a surface adherent to said lower surface of base layer (b), and an exposed surface, said layer (c) containing at least one polymer selected from the group consisting of ethylene-propylene-butene-1 terpolymer, ethylene-propylene random copolymer, ethylene-propylene block copolymer, isotactic polypropylene, low density polyethylene (LDPE), very low density polyethylene (VLDPE), linear low density polyethylene (LLDPE), medium density polyethylene (MDPE), said polymer being compounded with i) an effective amount of a particulate cross-linked hydrocarbyl-substituted polysiloxane anti-blocking agent and ii) a quantity of silicone oil such that a coefficient of friction-reducing amount is present on the exposed surface of layer (c) as well as the exposed surface of layer (a) after mutual contact of said surfaces.

In another aspect, the present invention relates to a method of making a film which comprises:

(1) providing the upper major surface of the above-described core layer (b) derived from a high density polyethylene with a coextensive water-based coating receiving upper skin layer (a) formed from at least one polymer selected from the group consisting of ethylene-propylene-butene-1 terpolymer, ethylene-propylene random copolymer, ethylene-propylene block copolymer, isotactic polypropylene, low density polyethylene (LDPE), very low density polyethylene (VLDPE), linear low density polyethylene (LLDPE), medium density polyethylene (MDPE), polyvinylidene chloride (PVDC), polyvinyl alcohol (PVOH) and acrylic, said upper skin layer (a) being substantially devoid of silicone oil;

(2) providing the lower major surface of core layer (b) with a coextensive surface lower skin layer (c) formed from at least one polymer selected from the group consisting of ethylene-propylene-butene-1 terpolymer, ethylene-propylene random copolymer, ethylene-propylene block copolymer, isotactic polypropylene, low density polyethylene (LDPE), very low density polyethylene (VLDPE), linear low density polyethylene (LLDPE), medium density polyethylene (MDPE), said lower skin layer (c) being compounded with i) an effective amount of a particulate cross-linked hydrocarbyl-substituted polysiloxane anti-blocking agent and ii) a quantity of silicone oil such that a coefficient of friction-reducing amount will be present on the exposed surface of layer (c) as well as the exposed surface of layer (a) after mutual contact of said surfaces; and (3) contacting the exposed surface of layer (c) with the exposed surface of layer (a) such that a coefficient of friction reducing amount of silicone oil is transferred from the exposed surface of layer (c) to the exposed surface of layer (a).

The film composition of the present invention can comprise a biaxially oriented high density base layer of at least 50 weight percent of a high density polyethylene having a density of 0.96 or higher. The skin layers are used with HDPE films which have been biaxially oriented to provide product having good WVTR properties as well as other characteristics, e.g., barrier properties for gases such as oxygen, which are desirable in packaging films.

Those embodiments wherein a skin layer consists essentially of PVDC, PVOH or acrylic exhibit reduced water vapor transmission rate and oxygen transmission rate.

The skin layers help provide a film which is readily castable while maintaining the desirable properties of HDPE including dead fold, twist retention, TD tear and moisture barrier. The films can be cast, and oriented in the solid state up to about two times in the machine direction and six times or more in the transverse direction to give films having good dead-fold and water vapor transmission rate characteristics making them highly suited for packaging, particularly for dry foods.

The films with or without heat seal compositions in the skins can be used on a wide variety of packaging machines such as vertical form, fill and seal (VFFS) and high speed horizontal slug wrapping machines and can also be used for twist wrapping machines and laminations.

The films of the present invention are especially suited for applications requiring good dead fold characteristics. The present films can exhibit crease retention (as measured by ASTM D 920-49) in either or both directions of greater than 70%, greater than 85%, or even greater than 95% after 30 seconds, e.g., 70% to 85% TD and 75% to 95% MD.

The present films can possess both good lubricity and good receptivity for water-based surface coating materials and optical clarity allows the convertor/end user to utilize inks and/or adhesives which do not incorporate organic solvents. Organic solvents generally present health, explosion and fire hazards and resort must be had to expensive ventilation and safety equipment to provide an acceptable working environment where they are used. Even with the use of such equipment, in some jurisdictions, the atmospheric emission of organic solvents is prohibited and expensive solvent recovery systems are required to comply with legal limitations. The films herein avoid organic solvent-containing coating materials thereby eliminating the health, safety and environmental problems attendant their use as well as the cost of the equipment required to deal with the hazards which they pose.

DETAILED DESCRIPTION

According to the present invention, the upper skin layer is derived from at least one polymer selected from the group consisting of ethylene-propylene-butene-1 terpolymer, ethylene-propylene random copolymer, ethylene-propylene block copolymer, isotactic polypropylene, low density polyethylene (LDPE), very low density polyethylene (VLDPE), linear low density polyethylene (LLDPE), medium density polyethylene (MDPE), polyvinylidene chloride (PVDC), polyvinyl alcohol (PVOH) and acrylic. Any polymer blends being of polymers which are compatible with one another. It should be noted that PVDC, PVOH and acrylic are incompatible with the other named polymers so that the former are used singly.

In one embodiment the upper skin layer (a) is derived from a random ethylene-propylene copolymer. This may be derived from ethylene and one or more co-monomers. The propylene content of these random copolymers is typically from about 70 to 85 weight percent, more usually from about 75 to 85 percent, with the balance of ethylene and any other comonomers such as butylene. Suitable copolymers of this type are random copolymers of ethylene and propylene or random terpolymers of ethylene, propylene and butylene. Preferred copolymers of this type include the following:

Ethylene-propylene copolymers containing 2–10 weight percent random ethylene, e.g. 3–7 weight percent ethylene.

Ethylene-propylene-butylene random terpolymers containing 1–5 weight percent random ethylene, 10–25 weight percent random butylene. The amounts of the random ethylene and butylene components in these copolymers are typically in the range of 10 to 25 percent total (ethylene plus butylene). Typical terpolymers of this type include those with about 1–5 percent ethylene and 10–25 percent butylene.

These copolymers typically have a melt flow rate in the range of about 5 to 10 with a density of about 0.9 and a melting point in the range of about 115° to about 130° C.

In another embodiment the upper skin layer (a) is derived from a low density polyethylene. This may be a linear low density polyethylene (LLDPE) or a non-linear polyethylene. These polymers typically have a melt index of 1 to 10. The low density polyethylenes should have a density of 0.88 to 0.93 while the linear materials may have a density as high as 0.94, usually in the range 0.90–0.94, e.g. 0.918 or 0.921, with a melt index from about 1 to about 10. The linear low density polyethylenes may be derived from ethylene together with other higher comonomers such as hexene-1 or octene-1.

Prior to incorporation in the film, e.g., before extrusion, upper layer (a) can be compounded with an anti-blocking effective amount of an anti-blocking agent, e.g., silica, clays, talc, glass, and the like which are preferably provided in the form of approximately spheroidal particles. The major proportion of these particles, for example, anywhere from more than half to as high as 90 weight percent or more, will be of such a size that significant portion of their surface area, for example, from about 10 to 70 percent thereof, will extend beyond the exposed surface of layer (a). In a preferred embodiment, the anti-blocking agent comprises particulate cross-linked hydrocarbyl-substituted polysiloxane anti-blocking agent. Particularly preferred particulate cross-linked hydrocarbyl-substituted polysiloxanes include the polymonoalkylsiloxanes. Most particularly preferred are non-meltable polymonoalkylsiloxanes characterized as having a mean particle size of 0.5 to 20.0 microns and a three dimensional structure of siloxane linkages. Such materials are available from Toshiba Silicone Co., Ltd., worldwide, and in the United States from General Electric Co., and are marketed under the tradename Tospearl. Other commercial sources of similar suitable materials are also known to exist. Such materials are further described as non-meltable crosslinked organosiloxane resin powders in U.S. Pat. No. 4,769,418, incorporated herein by reference. Effective amounts of the particulate cross-linked hydrocarbyl-substituted polysiloxane anti-blocking agent can range from 100 to 5000 ppm, preferably 1000 to 3000 ppm, say, from 2500 to 3000 ppm, based on loading of the resin from which the upper layer (c) is prepared.

Although the polymer from which layer (a) is formed is not compounded with a silicone oil, this layer will ultimately acquire a coefficient of friction-reducing amount of silicone oil. Thus, when the finished film laminate containing silicone oil on the exposed surface of layer (c) is taken up on a winding coil, some of the silicone oil will be transferred from this surface to the exposed surface of layer (a), primarily to the exposed surfaces of the anti-blocking agent particles which protrude from layer (a). However, since the interior of layer (a) contains no amount of silicone oil which could interfere with the heat sealing or other properties of this layer (and ordinarily contains no silicone oil at all), the presence thereon of the transferred silicone oil serves to reduce the coefficient of friction of the layer without significantly impairing its receptivity to water-based coatings, its heat sealability or its optical clarity.

Optionally, layers (a) and/or (c) can contain a minor amount of a wax, e.g., a microcrystalline wax for added lubricity and/or reduced water vapor transmission rate. Amounts of wax of from about 2 to about 15 weight percent of either or both layers (a) and (c) can be used if desired. Either or both of these layers can also contain pigments, fillers, stabilizers, light protective agents, antistatic agents, or other suitable modifying ingredients if desired.

While a variety of antistatic agents are available commercially which are suitable for use herein, the group of ethoxylated amines and ethoxylated amides is preferred for use in the practice of the present invention. Ethoxylated amines are available from the Humco Chemical Division of Whitco Chemical Corp. under the trademark of Kemamine®, from the Noury Chemical Company under the trademark of Armostat® and from other sources. Ethoxylated amides are available from Akzo Chemie America under the trademark of Ethmid®, from the Oxynol Chemical Company under the tradename of Oxynol® and from other sources. Particularly preferred for their migratory properties is the group of ethoxylated amines.

The range of antistatic agent levels useful in the practice of the present invention is from about 500 ppm to about 2000 ppm of layers (a) and/or (c), with about 1000 ppm to about 1500 ppm being particularly preferred.

In order to enhance its receptivity for water-based coatings and inks, layer (a) can be treated by such known and conventional techniques as corona discharge and flame treating.

Lower layer (c) of the film laminate can be of substantially the same composition as that of upper surface layer (a) except that i) the polymer is not derived from components selected from the group consisting of PVDC, PVOH and acrylic, ii) the polymer constituting layer (c) is compounded with a silicone oil and coefficient of friction reducing amounts of an anti-blocking agent which comprises particulate cross-linked hydrocarbyl-substituted polysiloxane as discussed above. The silicone oil advantageously possesses a viscosity of from about 350 to about 100,000 centistokes with 10,000 to about 30,000 centistokes being especially preferred. Examples of suitable silicone oils are polydialkylsiloxanes, polyalkylphenylsiloxanes, olefin-modified siloxane oils, olefin/-polyether-modified silicone oils, epoxy modified silicone oils and alcohol-modified silicone oils, polydialkylsiloxanes which preferably have from about 1 to about 4 carbon atoms in the alkyl group, in particular polydimethylsiloxanes of the foregoing, the polydialkylsiloxanes, in particular a polydimethylsiloxane, are preferred for use herein.

The silicone oil can be added to lower skin layer (c) generally in the form of a dispersion or emulsion, the silicone being present within, as well as on the exposed surface of this layer as discrete microglobules, frequently of an average size of from about 1 to about 2 microns. The silicone oil, which is generally substantially uniformly distributed on the exposed surface of layer (c), is responsible for imparting a reduced coefficient of friction to this surface as well as to the exposed surface of layer (a) when some of the oil is transferred thereto after these surfaces have been placed in mutual contact, e.g., as will occur when the laminate film has been wound on a winding coil.

Polydimethylsiloxane or other silicone oil can be present at from about 0.15 to about 1.5 weight percent of lower layer (c). Some of this silicone oil will, of course, be present on the exposed surface of layer (c). The amount selected should in any event be sufficient to provide a coefficient of friction of layers (a) and (c) (following transfer of silicone oil microglobules to the latter) of about 0.4 or less, preferably between about 0.25 to about 0.3 up to at least about 60° C. Because of the manner in which the silicone oil is applied to just the exposed surface of upper layer (a), such layer exhibits an improved coefficient of friction but not at the expense of its receptivity to water-based coatings, its heat sealability or its optical clarity.

The silicone oil should be incorporated as homogeneously as possible in the polymer constituting layer (c). This can be achieved by either incorporating the silicone oil as a dispersion or emulsion at room temperature and then heating the blend with the application of shearing forces or by incorporating the oil while the blend is being melted. The mixing temperature must be high enough to soften the blend and enable a very uniform mixture to be formed. The temperature required in a kneader or extruder is generally from about 170 to about 270° C.

In addition to silicone oil, layer (c) is compounded with an effective anti-blocking and coefficient of friction reducing amount of an anti-blocking agent which comprises particulate cross-linked hydrocarbyl-substituted polysiloxane, as described above. Effective amounts can range from 500 to 5000 ppm, preferably 1000 to 3000 ppm, say, from 2500 to 3000 ppm, based on loading of the resin from which the layer is prepared.

Core layer (b) is derived from imbalanced biaxially oriented film base layer made from a major proportion of a high density polyethylene (HDPE) having a density of at least 0.96. The film can be composed exclusively of a single HDPE resin, a mixture of HDPE resins, or of HDPE containing a minor proportion of other resource polymers. These high density polyethylenes typically have a melt index from about 0.5 to about 10, usually from about 0.7 to 2. The mixture of HDPE resins gives better processing characteristics in the extruder by reducing extruder torque.

Films made with a blend of HDPE resins reduce splittiness of the film which manifests itself as the tendency of the film to break in the TD direction during operation on vertical, form, fill and seal (VFFS) machinery.

The blends of HDPE polymers can comprise two or more polymers all of which preferably have densities of 0.96 or greater. Blends of HDPE polymers advantageously comprise a major proportion of HDPE having a melt index of 0.5 to 6 and one or more polymers having a different melt index.

Terblends have been found particularly desirable. Suitable terblends generally comprise 50 to 98 weight percent, preferably 84 to 96 weight percent of HDPE having a density of 0.96 or higher and a melt index of greater than 0.5 to about 1.0; 1 to 25 weight percent, preferably 3 to 8 weight percent of HDPE having a density of 0.96 or greater and a melt index of 0.1 to 0.5; and 1 to 25 weight percent, preferably 3 to 8 weight percent, of HDPE having a density of 0.96 or higher and a melt index of greater than 2 to about 8. Preferably, the second and third HDPE polymers which are minor components are present in about equal amounts.

In a preferred embodiment, the film of the present invention has both its upper skin layer and lower skin layer comprising a mixture of ethylene-propylene-butene-1 terpolymer and low density polyethylene (LDPE). For example, the upper skin layer and lower skin layer can comprise 85 to 95 wt %, say 90 wt, of ethylene-propylene-butene-1 terpolymer and 5 to 15 wt %, say 10 wt % low density polyethylene (LDPE).

The proper degree of orientation in the film contributes to the desired physical properties, as well as good WVTR and dead-fold characteristics. For example, it has been determined that films with a thickness of 1.4 to 4 mils will have acceptable WVTR (g-mil/100 in$^2$/24 hr–1 atm) of less than about 0.2/mil whereas a somewhat heavier gauge (1.5 times thicker or more) is needed in a blown HDPE film to achieve the same WVTR. The benefits of reduced WVTR are due to the improvements obtained by biaxial orientation below the HDPE melting point. Although higher density HDPE resin having a density of 0.957 or greater can be made directly into thin films by cast extrusion, problems of curling, uniformity, flatness and high WVTR remain as obstacles. Accordingly, thin HDPE films of about 0.8 to 1.5 mils having the best balance of properties, particularly for VFFS applications, are obtained with imbalanced biaxially oriented films prepared from films having a cast gauge of 12 to 20 mils reduced to the desired gauge by orientation. The final film gauge will typically be not more than about 2.5 mils.

The HDPE base film is oriented either before or after the skins are applied to a degree of 1.1:1 to about 2:1, usually from about 1.25:1 to 2:1, in the machine direction (MD), and to a degree of about 6:1 to about 12:1 in the transverse direction (TD). The films exhibit improved dead-fold, and other physical properties which are markedly better than cast and blown HDPE films, even when the total film thickness is reduced to less than about 1 or 2 mils. When provided with a skin layer as described below, the films are particularly suited for use in packaging, especially of dry foodstuffs. The films may be used in a wide variety of packaging equipment including vertical form, fill and seal (VFFS), high speed horizontal slug wrapping, as well as twist folding packaging machines.

The skin layers can be applied to the HDPE base film in any conventional manner, for example, by coating or coextrusion before orientation or by coating the HDPE after one or both of the biaxial orientation operations. Generally, the skin layers of the film of the invention comprise less than 50 wt %, preferably less than 15 wt %, say about 10 wt % of the total film.

The films may be produced and oriented in the conventional manner. When the skin layer is present on one or both sides of the HDPE film, cast extrusion is generally accomplished using a standard cast roll and water bath system.

In the usual manner the film is heated to its orientation temperature and first subjected to MD orientation between two sets of nip rolls, the second rotating at a greater speed than the first in an amount equal to the desired draw ratio. Then the film is TD oriented by heating and subjecting it to transverse stretching in a tenter frame. Typically MD orientation is conducted at 600 to 120° C. and TD orientation at 110° to 160° C.

The skin layers and/or base layer may contain stabilizers to minimize oxidative and thermal degradation, as well as other additives to achieve other functionality including, but not limited to, static reduction, ease of processing, ink receptivity, etc.

The invention is illustrated by the following non-limiting examples in which all parts are by weight unless otherwise specified.

EXAMPLE 1

A three-layer biaxially oriented film having a 1.15 mil final thickness was prepared by coextruding:

- a base layer HDPE (M-6211 obtained from Oxychem of Houston, Tex.) comprising 90% of the total film thickness;
- a first skin layer on one side of the base layer comprising 5% of the total film thickness which is Chisso 7510, obtained from Chisso Corp. of Japan, consisting of ethylene-propylene-butene-1 terpolymer and 2300 ppm Sylobloc 44™, an antiblock agent available from W. R. Grace (USA), the first skin layer being subjected to treatment by corona discharge; and
- a second skin layer on the other side of the base layer (Chisso 7820, obtained from Chisso Corporation of Japan), comprising 5% of the total film thickness, whose resin component is a blend of about 90% ethylene-propylene-butene-1 terpolymer and 10% LDPE with 2300 ppm Sylobloc 42™, an antiblock agent available from W. R. Grace (USA), which second skin layer further contains about 1 wt % of silicone oil.

The film was prepared in a standard cast roll system and then oriented 1.3 times in the MD at about 115° C., and 9.0 times in the TD direction at 1100°–160° C. in a tenter frame.

The film was tested for dead fold properties by ASTM D-920-49 (% crease retention after 30 seconds). In the transverse direction, the film of the present invention (HDPE with terpolymer skins) exhibited about 75% crease retention, and about 85% crease retention in the machine direction. This compares favorably with 0.80 mil polypropylene film with terpolymer skins (80 BSR-ONE available from Mobil Chemical Co. of Pittsford, N.Y. (8% TD, 6% MD)); 1.25 mil 100% polypropylene film (240 B available from Mobil Chemical Co. of Pittsford, N.Y. (15% TD, 13% MD)); 1.85 mil HDPE film with ionomer skin (Blown HD, available from American National Can Co. of Neenah, Wis. (47% TD, 36% MD)); and 2.0 mil wax coated glassine (55%).

EXAMPLE 2

A three-layer biaxially oriented film having a 1.15 mil final thickness was prepared in accordance with Example 1 except that 3000 ppm of Tospearl SF-344 available from GE, with a particle size of 4.5 microns, was compounded with the resin used for both skin layers prior to coextruding.

EXAMPLE 3

A three-layer biaxially oriented film having a 1.15 mil final thickness was prepared in accordance with Example 1 except that 1000 ppm of Tospearl SF-344 available from GE, with a particle size of 4.5 microns, was compounded with the resin used for the second skin layer prior to coextruding.

EXAMPLE 4

A three-layer biaxially oriented film having a 1.15 mil final thickness was prepared in accordance with Example 1 except that 2000 ppm of Tospearl SF-344 available from GE, with a particle size of 4.5 microns, was compounded with the resin used for the second skin layer prior to coextruding.

EXAMPLE 5

A three-layer biaxially oriented film having a 1.15 mil final thickness was prepared in accordance with Example 1 except that 3000 ppm of Tospearl SF-344 available from GE, with a particle size of 4.5 microns, was compounded with the resin used for the second skin layer prior to coextruding.

EXAMPLE 6

The films of Examples 1 to 5 were tested for kinetic coefficient of friction values for both their treated and untreated skins according to the procedure of ASTM D 1894-78. The results are set out below in the Table.

TABLE

|      |                              | Untreated Skin COF | Treated Skin COF |
|------|------------------------------|--------------------|------------------|
| EX.1 | (0 ppm Tospearl)             | 0.47               | 0.33             |
| EX.2 | (3000 ppm Tospearl) (both layers) | 0.23               | 0.21             |
| EX.3 | (1000 ppm Tospearl)          | 0.34               | 0.35             |
| EX.4 | (2000 ppm Tospearl)          | 0.34               | 0.35             |
| EX.5 | (3000 ppm Tospearl)          | 0.23               | 0.35             |

The addition of particulate cross-linked hydrocarbyl-substituted polysiloxane as an antiblocking/slip agent in the resin of both layers (Ex. 2) results in a significant decrease in coefficient of friction values both for untreated surface to untreated surface and treated surface to treated surface. The addition of particulate cross-linked hydrocarbyl-substituted polysiloxane as an antiblocking/slip agent in the resin of the lower untreated skin layer (Ex. 3 to 5) results in a significant decrease in coefficient of friction values for untreated surface to untreated surface. This provides enhanced machinability of the film for both horizontal and vertical packaging machines.

It is claimed:

1. A method of making a film which comprises:

(1) providing an upper major surface of a core layer (b) comprising a high density polyethylene with a coextensive water-based coating receiving layer (a) formed from a polymer selected from at least one of the group consisting of ethylene-propylene-butene-1 terpolymer, ethylene-propylene random copolymer, ethylene-propylene block copolymer, isotactic polypropylene, low density polyethylene (LDPE), very low density polyethylene (VLDPE), linear low density polyethylene (LLDPE), medium density polyethylene (MDPE), polyvinylidene chloride (PVDC), polyvinyl alcohol (PVOH) and acrylic, said polymer being compounded with an effective amount of anti-blocking agent, but being substantially devoid of silicone oil;

(2) providing a lower major surface of core layer (b) with a coextensive surface layer (c) formed from a polymer selected from at least one of the group consisting of ethylene-propylene-butene-1 terpolymer, ethylene-propylene random copolymer, ethylene-propylene block copolymer, isotactic polypropylene, low density polyethylene (LDPE), very low density polyethylene (VLDPE), linear low density polyethylene (LLDPE), medium density polyethylene (MDPE), said polymer being compounded with i) an effective amount of a coefficient of friction reducing, anti-blocking amount of anti-blocking agent comprising a particulate cross-linked hydrocarbyl-substituted polysiloxane and ii) a quantity of silicone oil such that a coefficient of friction-reducing amount will be present on an exposed surface of layer (c) as well as an exposed surface of layer (a) after mutual contact of said surfaces; and (3) contacting the exposed surface of layer (c) with the exposed surface of layer (a) such that a coefficient of friction reducing amount of silicone oil is transferred from the exposed surface of layer (c) to the exposed surface of layer (a).

2. The method of claim 1 wherein said particulate cross-linked hydrocarbyl-substituted polysiloxane is present in the polymer of surface layer (c) in amounts ranging from 100 to 5000 ppm.

3. The method of claim 1 wherein following step (2), the exposed surface of layer (a) is subjected to corona discharge or flame treatment.

4. The method of claim 1 wherein a particulate cross-linked hydrocarbyl-substituted polysiloxane is present in the polymer of receiving layer (a) in amounts ranging from 100 to 5000 ppm.

* * * * *